US008136543B2

(12) United States Patent
Davies, Jr.

(10) Patent No.: US 8,136,543 B2
(45) Date of Patent: Mar. 20, 2012

(54) AXIAL FLOW CONTROL VALVES HAVING AN INTERNAL ACTUATOR

(75) Inventor: Lonnie Oscar Davies, Jr., Marshalltown, IA (US)

(73) Assignee: Fisher Controls International, LLC, Marshalltown, IA (US)

(*) Notice: Subject to any disclaimer, the term of this patent is extended or adjusted under 35 U.S.C. 154(b) by 533 days.

(21) Appl. No.: 12/360,650

(22) Filed: Jan. 27, 2009

(65) Prior Publication Data

US 2010/0187462 A1 Jul. 29, 2010

(51) Int. Cl.
*F16K 1/12* (2006.01)
(52) U.S. Cl. ......................... 137/220; 137/221
(58) Field of Classification Search ........... 137/219–222
See application file for complete search history.

(56) References Cited

U.S. PATENT DOCUMENTS

| | | | | |
|---|---|---|---|---|
| 1,919,112 | A | * | 7/1933 | Kinzie ........................... 137/221 |
| 2,725,891 | A | * | 12/1955 | De Bourguignon et al. .. 137/219 |
| 3,556,128 | A | * | 1/1971 | Scaglione ..................... 137/219 |
| 4,327,757 | A | * | 5/1982 | Weevers ..................... 137/625.3 |
| 7,353,837 | B2 | * | 4/2008 | Biester ......................... 137/219 |
| 2003/0196698 | A1 | * | 10/2003 | Lin et al. ....................... 137/219 |
| 2005/0211941 | A1 | | 9/2005 | LaVergne, Jr. |
| 2008/0173363 | A1 | | 7/2008 | Betting |
| 2008/0224075 | A1 | | 9/2008 | Emin |

FOREIGN PATENT DOCUMENTS

| | | |
|---|---|---|
| EP | 0257906 | 3/1988 |
| GB | 2166847 | 5/1986 |
| WO | 8400592 | 2/1984 |
| WO | 2006070020 | 7/2006 |
| WO | 2007048942 | 5/2007 |

OTHER PUBLICATIONS

Mokveld Valves, "Safety Instrumented System," Mokveld Valves BV, published Jun. 2008, 8 pages.
Mokveld Valves, "Axial Surge Relief Valve," Product Bulletin, Mokveld Valves BV, published Aug. 2008, 2 pages.
International Searching Authority, "International Search Report," issued in connection with international application serial No. PCT/US2009/069792, mailed Mar. 17, 2010, 3 pages.
International Searching Authority, "Written Opinion of the International Searching Authority," issued in connection with international application serial No. PCT/US2009/069792, mailed Mar. 17, 2010, 5 pages.

* cited by examiner

*Primary Examiner* — Craig Schneider
(74) *Attorney, Agent, or Firm* — Hanley, Flight & Zimmerman, LLC

(57) ABSTRACT

Axial flow control valves are described herein. An example axial flow control valve described herein includes a valve body defining a passageway between an inlet and an outlet that is substantially parallel to a fluid flow path at the inlet and the outlet of the valve body. The example control valve includes a cartridge assembly removably coupled to the valve body and disposed within the passageway of the valve body between the inlet and the outlet. The cartridge assembly is substantially axially aligned with the passageway and includes a motor to operate the axial flow control valve between a first position to prevent the flow of fluid between the inlet and the outlet and a second position to allow the flow of fluid between the inlet and the outlet.

19 Claims, 4 Drawing Sheets

AXIAL FLOW CONTROL VALVES HAVING AN INTERNAL ACTUATOR

FIELD OF THE DISCLOSURE

The present disclosure relates generally to axial flow valves and, more particularly, to axial flow control valves having an inline, internal actuator.

BACKGROUND

Control valves (e.g., sliding stem valves, rotary valves, axial flow valves, etc.) are commonly used in process control systems to control the flow of process fluids. A control valve typically includes an actuator (e.g., a pneumatic actuator, hydraulic actuator, etc.) that automates operation of the control valve. Typical actuators are coupled to an exterior surface of the valve body (e.g. the valve bonnet) of the control valve. Some applications, particularly in process control systems having larger diameter sliding stem valves or rotary valves, may have performance limitations because larger sized sliding stem or rotary valves often require long-stroke actuators to actuate a flow control member of the valve. Such long-stroke actuators increase the weight and the dimensional envelope of the control valve assembly. Thus, in some applications, large-sized sliding stem or rotary valves may not be practical.

Axial or in-line flow control valves are an alternative to sliding stem and rotary control valves. Axial flow valves have a flow path or passageway that is substantially parallel to the fluid flow path to minimize turbulent flow through the valve body. Axial flow control valves typically include an actuator mounted to an exterior surface of the valve body and oriented substantially perpendicular to the fluid flow path. The actuator is operatively coupled to a flow control member of the valve and moves the flow control member between an open position and a closed position to allow or prevent the flow of fluid through the valve. Some known axial flow control valves include an externally mounted rack-on-rack (i.e. as opposed to a rack-and-pinion) actuators to actuate a flow control member within the valve body relative to a seat ring to control fluid flow through the valve body. Mokveld Valves BV of Houston, Tex. offers such a known axial flow control valve.

However, externally mounted actuators may be susceptible to unwanted leakage past the valve body. More specifically, such an externally mounted actuator configuration requires use of packing to seal against a valve stem or shaft that extends outside the valve body to couple to the actuator. Such packing can fail (e.g., due to wear) and result in leakage of the fluid outside the valve body and into the environment surrounding the valve and add additional costs to the valve, and/or add additional maintenance requirements and costs. Because the actuator is substantially perpendicular to the flow path of the fluid in such an arrangement, the externally mounted actuator configuration may require additional space which, in practice, is often very limited.

Additionally, axial flow control valves and, particularly larger sized axial flow control valves, having externally mounted actuators require more precise alignment to prevent undesired leakage between the valve body and the actuator. Such precise alignment and accurate, tighter tolerances typically require more precise manufacturing and machining. Therefore, such known control valves are complex and, thus, more expensive to manufacture because they require additional machining and may require additional maintenance.

SUMMARY

In one example, an axial flow control valve includes a valve body defining a passageway between an inlet and an outlet that is substantially parallel to a fluid flow path at the inlet and the outlet of the valve body. The example control valve includes a cartridge assembly removably coupled to the valve body and disposed within the passageway of the valve body between the inlet and the outlet. The cartridge assembly is substantially axially aligned with the passageway and includes an inline, internal actuator to operate the axial flow control valve between a first position to prevent the flow of fluid between the inlet and the outlet and a second position to allow the flow of fluid between the inlet and the outlet.

In another example, a control valve described herein includes a valve body having a passageway between an inlet and an outlet. A flow control member is slidably coupled to a housing. The flow control member and the housing are disposed within the passageway of the valve body. An inline, internal actuator is coupled to the housing and mounted inside the valve body. The inline, internal actuator and the flow control member are substantially axially aligned with a flow path at the inlet and the outlet. The inline, internal actuator drives the flow control member toward a valve seat to prevent the flow of fluid through the valve body and away from the valve seat to allow the flow fluid through the valve body.

In yet another example, a valve trim apparatus for use with an axial flow valve includes a cage coupled to a valve seat at a first end and coupled to a bonnet at a second end so that the bonnet and the cage form a cavity. A flow control member is slidably disposed within the cavity and is to be driven to a first position to engage the valve seat and a second position spaced from the valve seat. A motor drives the flow control member between the first position and the second position. A valve stem is operatively coupled to the motor at a first end and coupled to the flow control member at a second end. The valve trim assembly is to be mounted inside a valve body substantially parallel to a fluid flow path through the valve body.

DETAILED DESCRIPTION

Figure 1:
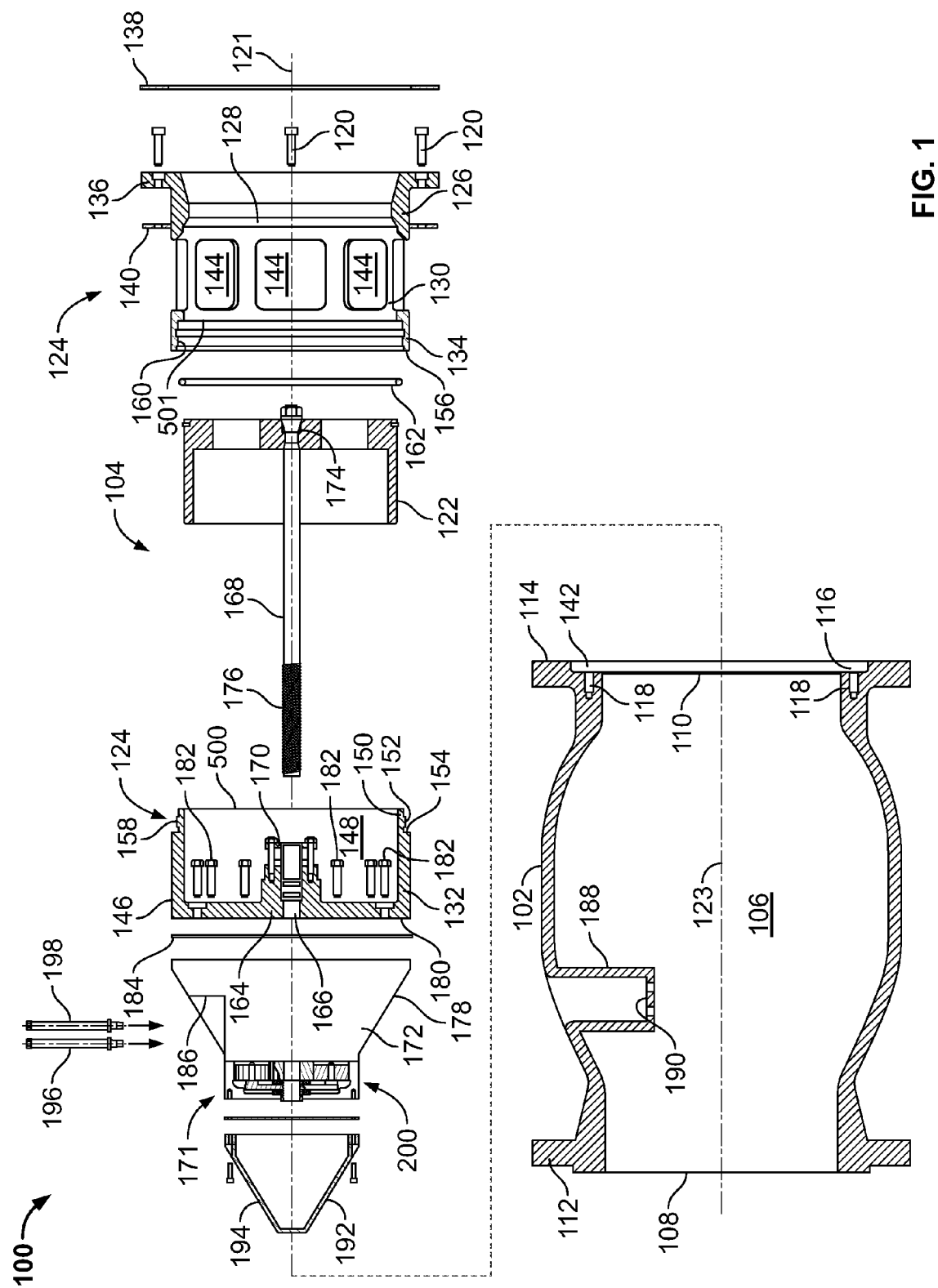
FIG. 1 illustrates a cross-sectional exploded view of an example axial flow control valve described herein.

The example axial flow control valves described herein advantageously reduce manufacturing costs and maintenance, provide an axially aligned passageway to reduce turbulent fluid flow to improve flow capacity, substantially eliminate susceptibility to unwanted leakage due to misalignment of the actuator and the valve body, and reduce the overall dimensions or envelope of the valve body and actuator assembly. In general, the example control valves described herein include an inline, internal actuator (e.g., an internal motor assembly having a gear set or transmission) and a flow control member removably coupled to a valve body in substantial axial alignment with (i.e., substantially parallel to) a fluid flow passageway of the valve body.

In particular, an example axial control valve described herein has a cartridge assembly (e.g., valve trim components) that includes a flow control member, a cage, a bonnet, a valve seat, an internal motor assembly, and a valve stem. The cartridge assembly is removably coupled within the valve body and substantially axially aligned with the fluid flow passageway through the valve. The example removable cartridge assembly described herein advantageously eliminates or substantially reduces misalignment between valve trim components and a valve body because the cartridge assembly is disposed within or mounted inside the valve body and axially aligned with the fluid flow path through the valve body. Additionally, the flanged-cartridge concept eliminates the necessity of an internal structure or webbing within the valve body typically required to support the valve trim.

More specifically, in the example axial flow control valves described herein, an internal motor assembly is mounted inside the valve body and substantially axially aligned or parallel to the fluid flow path through the valve. Also, the example removable cartridge assembly simplifies or facilitates maintenance of the valve trim components. Furthermore, the example axial flow control valves described herein reduce environmental pollution due to unwanted leakage caused by packing failure because the internal motor assembly is disposed within or mounted inside the valve body, thereby eliminating the need for a valve stem to pass through the valve body via a packing, which can fail and allow fluid to leak past the valve stem. Still further, because the example cartridge assembly is disposed inside or within a valve body and is axially aligned with the flow passageway or path through the valve body, manufacturing and machining requirements are greatly simplified, thereby decreasing the cost of manufacturing. The internally mounted axially aligned motors of the example valves described herein also provide a more compact valve that requires a reduced mounting footprint and dimensioned envelope and, thus, substantially less space requirements. Additionally, the axially aligned passageway of the example valves described herein reduces flow restriction through the valves.

Figure 3:
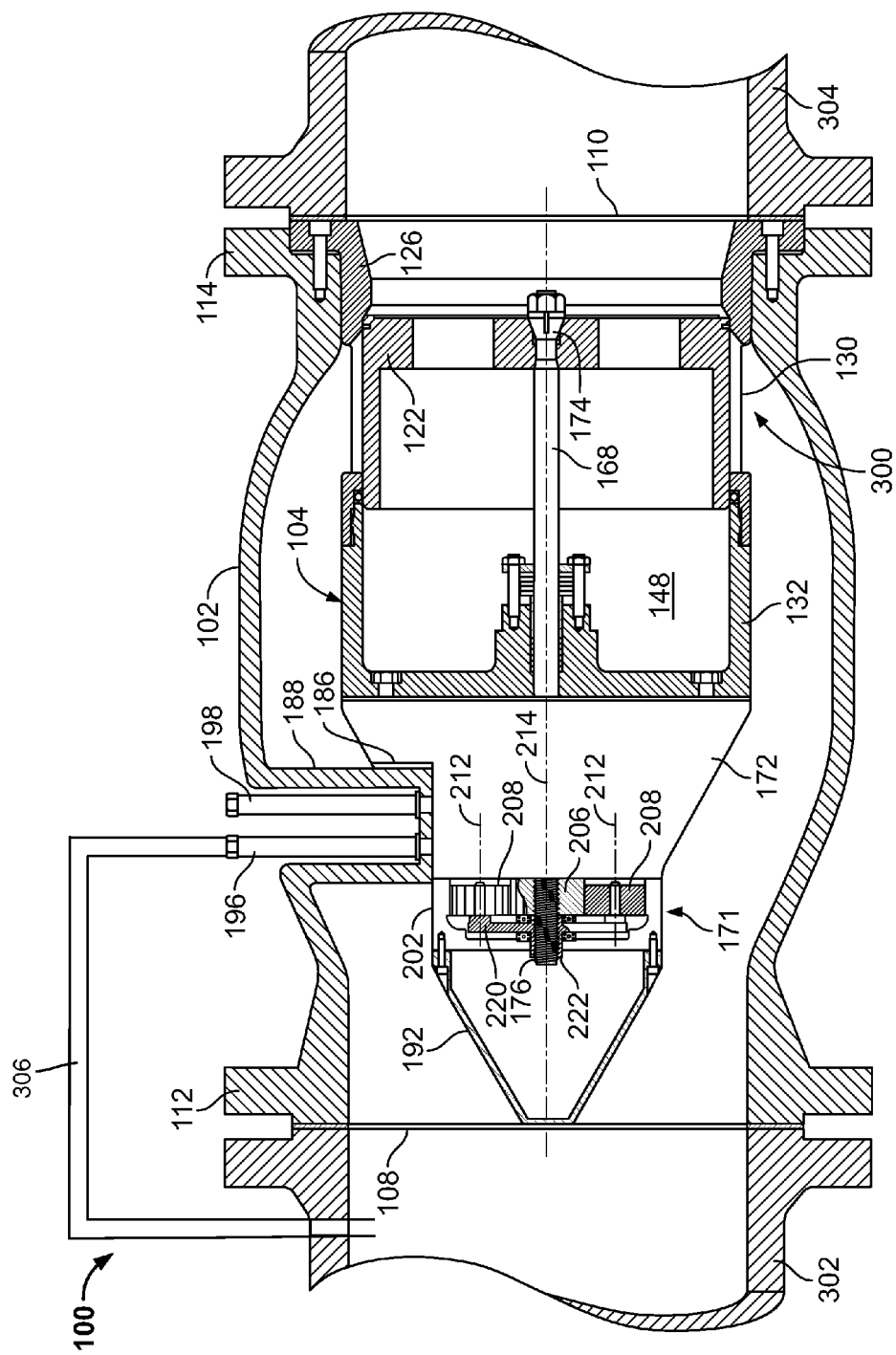
FIG. 3 illustrates a cross-sectional assembly view of the example axial flow control valve of FIG. 1 in a first control position.
Figure 4:
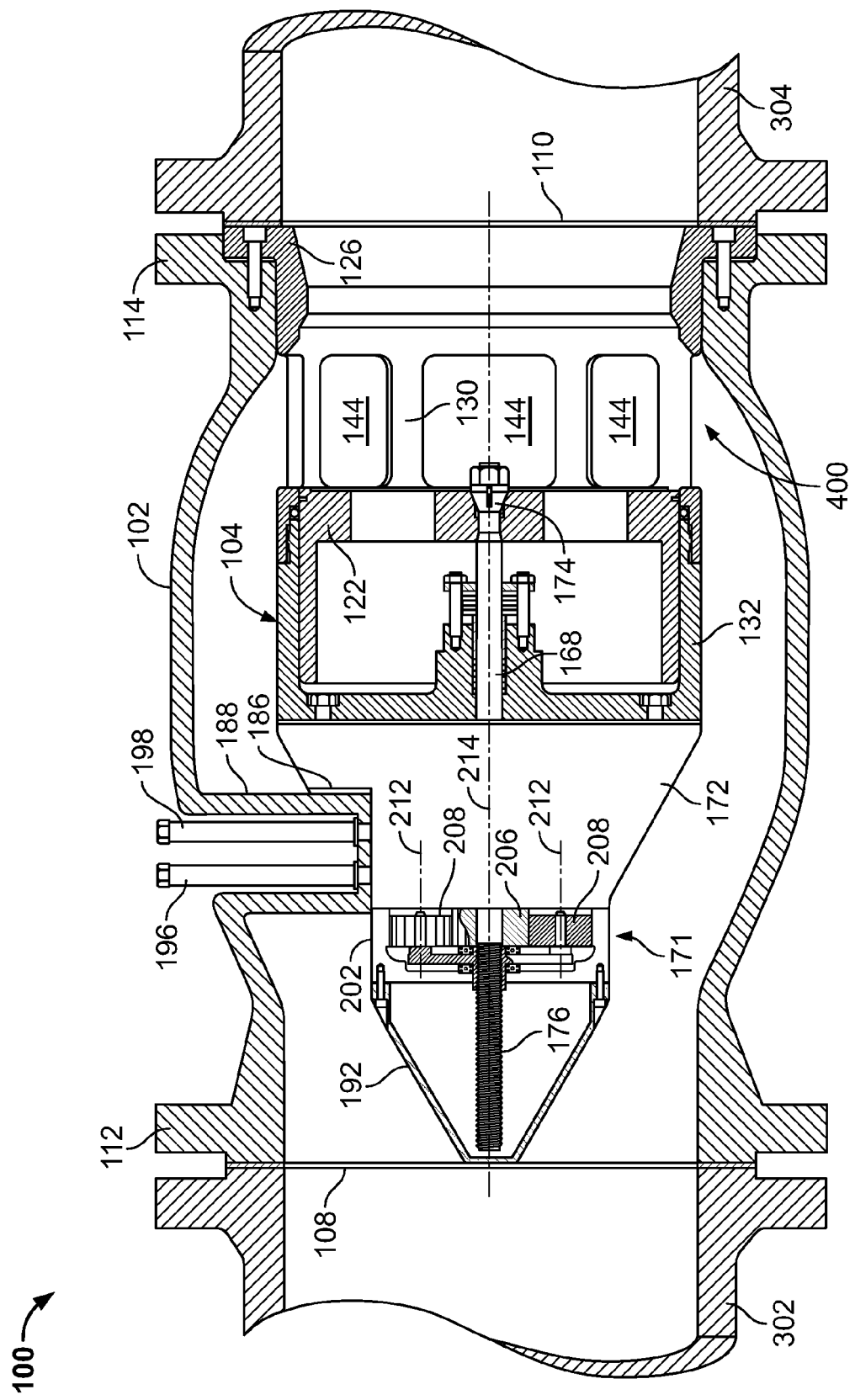
FIG. 4 illustrates the example axial flow control valve of FIGS. 1 and 3 in a second control position.

FIG. 1 illustrates an exploded view of an example axial flow control valve 100 described herein. The axial flow control valve 100 includes a valve body 102 to receive a cartridge assembly 104. The valve body 102 defines a passageway 106 that is substantially parallel to a fluid flow path between an inlet 108 and an outlet 110 when the valve body 102 is installed in a fluid process system (e.g., a distribution piping system). The valve body 102 includes a first flange 112 at the inlet 108 to couple the valve body 102 to an upstream pipeline 302 (FIGS. 3 and 4) and includes a second flange 114 at the outlet 110 to couple the valve body 102 to a downstream pipeline 304 (FIGS. 3 and 4).

The valve body 102 includes a recessed portion 116 adjacent the outlet 110 and having apertures 118 to receive fasteners 120 (e.g., bolts) to removably couple the cartridge assembly 104 to the valve body 102. In other examples, the cartridge assembly 104 may be removably coupled to the valve body 102 with any other suitable fastening mechanism(s). In some examples, a pipe (not shown) having a short length may be disposed between the second flange 114 and the downstream pipeline 304. In this manner, the shorter length pipe may be removed to facilitate access to the cartridge assembly 104 during maintenance.

The cartridge assembly 104 is disposed within or mounted inside the passageway 106 of the valve body 102 such that its longitudinal axis 121 is substantially axially aligned or substantially parallel to a longitudinal axis 123 of the passageway 106 and fluid flow therethrough. In the illustrated example, the cartridge assembly 104 comprises an inline, integral actuator 200, a flow control member 122 slidably coupled to a housing 124. As shown in the example, the housing 124 includes a valve seat 126 coupled to a first end 128 of a cage 130 and a bonnet 132 coupled to a second end 134 of the cage 130. In some examples, the valve seat 126 may be integrally formed with the cage 130 as a substantially unitary piece or structure.

The valve seat 126 is disposed adjacent the outlet 110 and includes a flange portion 136 that engages the recessed portion 116 of the valve body 102 when the cartridge assembly 104 is coupled the valve body 102. A flange seal 138 (e.g., a flange gasket) may be disposed between the second flange 114 of the valve body 102 and the downstream piping 304 to provide a tight seal and prevent unwanted leakage through the second flange 114. Additionally, a seal member 140 (e.g., a flange gasket) may be disposed between the flange portion 136 of the valve seat 126 and a surface 142 of the valve body 102.

The cage 130 slidably receives the flow control member 122 and includes openings 144 to provide certain fluid flow characteristics such as, for example, reduced noise, reduced cavitation generated by the flow of fluid through the valve body 102, etc. The cage 130 may be implemented using any suitable configuration, design, and/or shape to provide any suitable desired flow characteristics to suit the needs of a particular control application.

The integral actuator 200 includes transmission 171 coupled to a motor 172 and a housing 124 wherein the housing 124 includes a bonnet 132 having a cylindrical body 146 having a cavity 148 to slidably receive at least a portion of the flow control member 122. An end 150 of the cylindrical body 146 includes a thread portion 152 that engages the second end 134 of the cage 130 to couple the bonnet 132 to the cage 130. The stepped portion 152 forms a shoulder 154 that engages an end 156 of the cage 130 and has a threaded surface 158 that is complementary to a surface 160 of the second end 134 of the cage 130 to facilitate engagement and alignment of the cage 130 and the bonnet 132. In other examples, the bonnet 132 may be coupled to the cage 130 with fasteners and/or any other suitable fastening mechanism(s). A sealing member 162 such as, for example, a C-shaped seal, may be disposed between the surfaces 500 and 501 to provide a tight seal and prevent unwanted leakage between the bonnet 132 and the plug 122. The bonnet 132 further includes a protruding member 164 having an aperture 166 to slidable receive a valve stem 168. Furthermore, the bonnet 132 may include a packing system 170 to prevent unwanted leakage along or past the valve stem 168.

The flow control member 122 is sized to fit closely within the cage 130 so that flow control member 122 is slidable within the cage 130 and the bonnet 132. The flow control member 122 may be any suitable flow control member such as, a balanced valve plug, an unbalanced valve plug, etc. In operation, the flow control member 122 is driven in a first direction toward the valve seat 126 to restrict or prevent the flow of fluid through the valve body 102 and in a second direction away from the valve seat 126 to allow or increase the flow of fluid through the valve body 102.

To drive the flow control member 122 between the first and second directions, the integral actuator 200 is operatively coupled to the flow control member 122 via the valve stem 168. The valve stem 168 is coupled to the flow control member 122 at a first end 174 (e.g., via a fastener) and is operatively coupled to the motor 172 at a second end 176. In this example, at least a portion of the second end 176 of the valve stem 168 includes threads that threadably engage the transmission 171 which, in turn, drives the flow control member 122 between the first and second directions.

The motor 172 includes a housing 178 that is coupled to a surface 180 of the bonnet 132 via, for example, fasteners 182, or any other suitable fastening mechanism(s). A seal member 184 (e.g., a gasket) may be disposed between the surface 180 of the bonnet 132 and the housing 178. The housing 178 may include a shoulder 186 to engage a shoulder 188 formed in the valve body 102 when the cartridge assembly 104 is coupled within or mounted inside the valve body 102. The shoulder 188 of the valve body 102 may include a port 190 that receives means to power the motor 172 such as, for example, one or more of an air supply hose, a hydraulic hose, an electrical conduit, etc. In other examples, the upstream fluid pressure may be fluidly coupled to the motor 172 to provide means to power the motor 172. For example, the upstream fluid pressure may activate or drive the motor 172 when it reaches a predetermined pressure and then exhaust to the downstream fluid after activating the motor 172. For example, as shown in FIG. 3, the port 190 may be fluidly coupled to an upstream fluid pressure via a conduit, channel or hose.

As more clearly shown in FIG. 3, the shoulder 188 of the valve body 102 supports the cartridge assembly 104 when the cartridge assembly 104 is disposed within or mounted inside the passageway 106. Returning to FIG. 2, a protective member 192 may be coupled to the inlet 108 side of the motor 172 to protect the motor 172 and the second end 176 of the valve stem 168 from fluid flowing through the inlet 108. The protective member 192 is shown as a cone having a tapered surface 194, which directs or diverts the fluid from the inlet 108 away from the motor 172 and toward the outlet 110.

In the illustrated example, the motor 172 is depicted as a pneumatic motor. A pneumatic motor may be advantageous for use with volatile process fluid such as, for example, natural gas. However, in other examples, the motor 172 may be any motor such as, for example, an alternating current (AC) motor, a direct current (DC) motor, a variable frequency motor, a stepper motor, a servo motor, a hydraulic motor, an actuator (e.g., hydraulic, pneumatic, etc.) or any other suitable motor or drive member.

The motor 172 includes a first inlet to receive pressurized fluid (e.g., air, hydraulic oil, etc.) via a first port 196 (e.g., a hose) to cause the motor 172 to rotate in a first direction and a second inlet to receive pressurized fluid via a second port 198 (e.g., a hose) to cause the motor 172 to rotate in a second direction opposite the first direction. The rotation of the motor 172 moves the valve stem 168 rectilinearly via the transmission 171 in the first direction or the second direction in response to pressurized fluid being received via the first port 196 or the second port 198, respectively. As shown in FIG. 3, the first port 196 and/or the second port 198 may be fluidly coupled to the upstream fluid pressure via a conduit or hose 306. The transmission 171 is operatively coupled to the motor 172 and the second end 176 of the valve stem 168. Although not shown, the motor 172 has an aperture to allow the valve stem 168 to pass therethrough to the transmission 171. The transmission 171 may be, for example, an acme screw system, a gear system, a ball screw system, a leadscrew system, and/or any other suitable transmission system to convert rotational motion of the motor 172 to rectilinear displacement of the valve stem 168. In yet other examples, the motor 172 may be directly coupled to the second end 176 of the valve stem 168. In such a direct-drive configuration, the motor 172 directly drives the valve shaft 168 without any other interposing mechanism or device such as a transmission or the like.

The example valve body 102 may be made of any suitable material such as, for example, cast iron, carbon steel, corrosion resistant materials such as, for example, stainless steel, high nickel steel, etc., and/or any other suitable material(s), or a combination thereof. Similarly, the cartridge assembly 104 may be made of any suitable material such as, for example, cast iron, carbon steel, corrosion resistant materials such as, for example, stainless steel, high nickel steel, etc., and/or any other suitable material(s), or a combination thereof.

Figure 2:
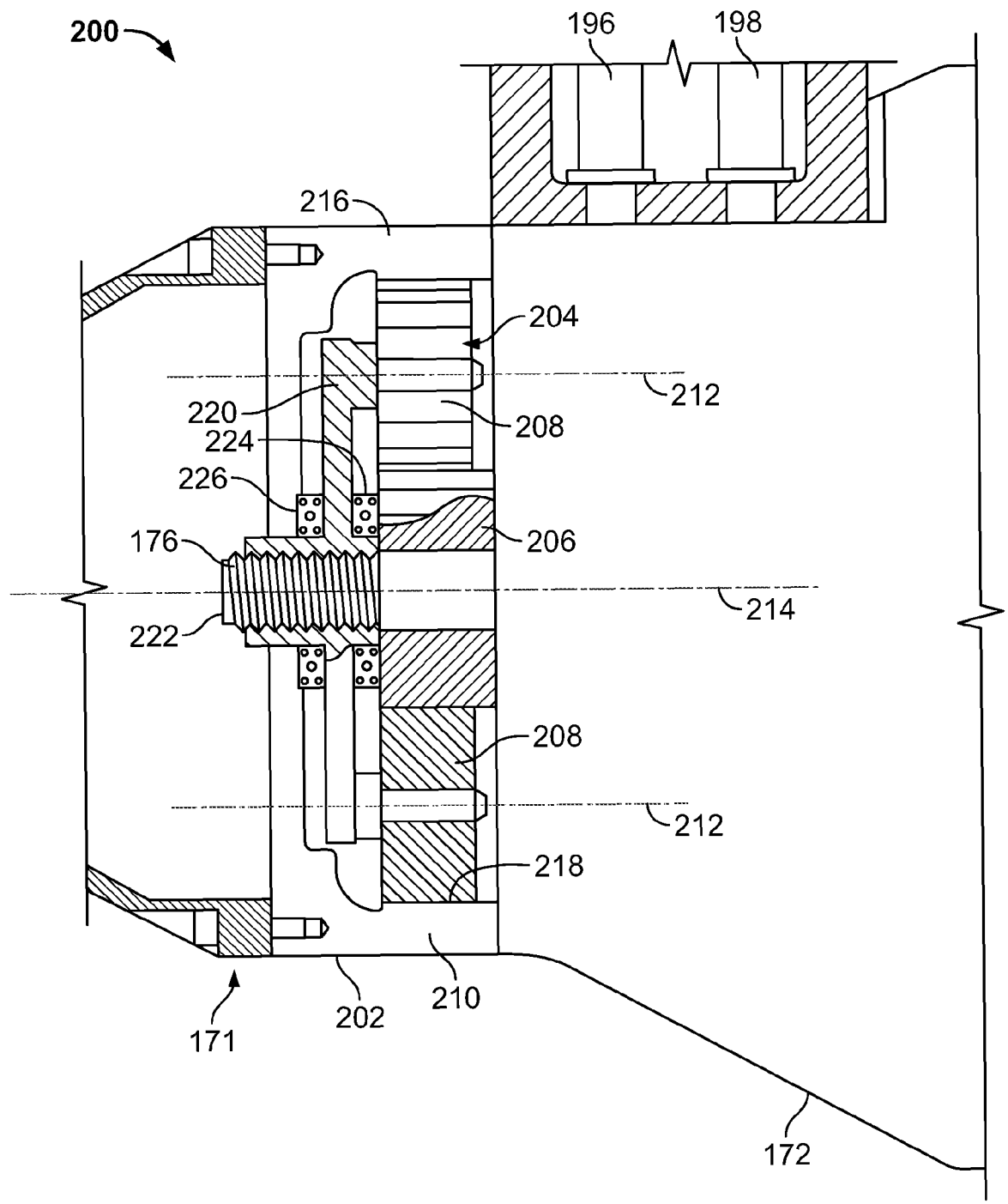
FIG. 2 illustrates an example drive member for use with the example axial flow control valve of FIG. 1.

Referring to FIG. 2, the transmission 171 includes a gearbox 202 operatively coupled to the motor 172. Specifically, the gearbox 202 includes a planetary gear configuration 204. The motor 172 engages a first gear or sun gear 206. The sun gear 206, in turn, is coupled to a plurality of planetary gears 208 disposed between a stationary ring gear 210 and the sun gear 206. As described in greater detail below, each of the planetary gears 208 rotates about an axis 212 and is radially displaced relative to an axis 214 as the sun gear 206 is rotated by the motor 172 about the axis 214.

In this example, the ring gear 210 is integrally formed with a housing 216 of the gearbox 202 and includes gear teeth 218 that protrude radially from the housing 216 toward the axis 214. The planetary gears 208 are operatively coupled via an arm member 220 so that radial displacement or movement of the planetary gears 208 causes the arm member 220 to rotate relative to the axis 214. The arm member 220 includes a threaded aperture 222 to threadably engage the threaded portion of the second end 176 of the valve stem 168 so that rotation of the arm member 220 about the axis 214 causes rectilinear displacement of the valve stem 168 along the axis 214. A first thrust bearing 224 may be disposed between the sun gear 206 and the arm member 220 and a second thrust bearing 226 may be disposed between the arm member 220 and the housing 216. The thrust bearings 224 and 226 prevent axial movement of the sun gear 206 and/or the arm member 220 along the axis 214 and absorb axial thrust generated along the axis 214 during operation of the axial flow control valve 100.

The gearbox 202 advantageously amplifies the torque generated by the motor 172 and transmits the amplified torque to drive the valve stem 168. The amplified torque transmitted to the valve stem 168 enables the flow control member 122 to engage the valve seat 126 with a greater force and, thus, provide a tighter sealing engagement with the valve seat 126 to prevent the flow of fluid through the valve body 102. Furthermore, a smaller sized motor 172 may be used to drive the flow control member 122 because the gearbox 202 amplifies the torque generated by the motor 172. In this example, the amount of torque amplification provided by the gearbox 202 can vary based on the size (e.g., the diameter, number of gear teeth, etc.) of the gears 206 and 208.

FIG. 3 illustrates the axial flow control valve 100 in a first or closed position 300 and FIG. 4 illustrates the axial flow control valve 100 in a second or open position 400. Referring to FIGS. 1, 2, 3 and 4, the axial flow control valve 100 is interposed in a fluid flow path between an upstream supply source via the upstream pipe 302 and a downstream supply source via the downstream pipe 304. The process fluid may include any process fluid such as, for example, natural gas. In operation, the cartridge assembly 104 operates between the first position 300 to prevent the flow of fluid between the inlet 108 and the outlet 110 (e.g., the closed position) as shown in FIG. 3 and the second position 400 to allow the flow of fluid between the inlet 108 and the outlet 110 (e.g., the open position) as shown in FIG. 4.

In operation, to move the axial flow control valve 100 to the first position 300 shown in FIG. 3, the motor 172 receives a control fluid (e.g., pressurized air) via the first port 196. The control fluid causes the motor 172 to rotate in a first direction (e.g., a counterclockwise direction) about the axis 214 to generate a torque. The torque generated by the motor 172 may be varied by increasing or decreasing the pressure of the control fluid to the motor 172. Specifically, the motor 172 transmits torque to rotate the sun gear 206 about the axis 214 which, in turn, rotates each of the planetary gears 208 about their respective axis 212. As the sun gear 206 rotates relative to the axis 214, the teeth of the sun gear 206 engage the teeth of the planetary gears 208. Thus, rotation of the sun gear 206 in a first direction (e.g., counterclockwise direction) about the axis 214 causes each of the planetary gears 208 to rotate in a first direction (e.g., a clockwise direction) about the axis 212 and rotation of the sun gear 206 in a second direction (e.g., counterclockwise direction) opposite the first direction causes each of the planetary gears 208 to rotate in a second direction (e.g., a clockwise direction) about their respective axis 212.

In turn, the teeth of the planetary gears 208 also engage the teeth 218 of the stationary ring gear 210. Because both the ring gear 210 and the sun gear 206 are restrained or fixed laterally relative to the axis 214, the planetary gears 208 move in a radial path about the axis 214 relative to the ring gear 210 and the sun gear 206 as each of the planetary gears 208 rotates about its respective axis 212. Such radial displacement or movement of the planetary gears 208 relative to the axis 214 cause the arm member 220 to rotate about the axis 214 because the arm member 220 is coupled to the planetary gears 208. Rotation of the arm member 220 about the axis 214 causes the threads 222 of the arm member 220 to rotate about the threaded portion of the second end 176 of the valve stem 168. Because the arm member 220, the sun gear 206, the planetary gears 208 and the ring gear 210 are radially and laterally restrained relative to the axis 214, rotation of the arm member 220 in a first direction drives the valve stem 168 in the first rectilinear direction along the axis 214 when the sun gear 206 rotates in the first direction (e.g., a counterclockwise direction) about the axis 214. In turn, the valve stem 168 drives the flow control member 122 toward the valve seat 126 to the first position 300 to reduce or prevent the flow of fluid between the inlet 108 and the outlet 110.

Conversely, to move the axial flow control valve 100 to the second position 400 shown in FIG. 4, the motor 172 receives a control fluid (e.g., pressurized air) via the second port 198. The control fluid causes the motor 172 to rotate in a second direction (e.g., a clockwise direction) opposite the first direction to generate a torque that drives the sun gear 206 in the second direction (e.g., clockwise direction). As the sun gear 206 rotates relative to the axis 214, the teeth of the sun gear 206 engage the teeth of the planetary gears 208 to cause each of the planetary gears 208 to rotate in the second direction (e.g., a clockwise direction) about their respective axis 212. As stated above, the planetary gears 208 radially move relative the axis 214 when each of the planetary gears 208 rotates about its respective axis 212 because the ring gear 210 and the sun gear 206 are radially fixed relative to the axis 214. Radial displacement of the planetary gears 208 about the axis 214 in the second direction causes the arm member 220 to also rotate in a second direction relative to the axis 214. Rotation of the arm member 220 in the second direction drives the valve stem 168 in a second rectilinear direction along the axis 214 opposite the first direction when the sun gear 206 rotates in the second direction (e.g., a counterclockwise direction) about the axis 214. In turn, rectilinear displacement of the valve stem 168 in the second direction along the axis 214 causes the flow control member 122 to move away from the valve seat 126 to the second position 400 to allow or increase the flow of fluid between the inlet 108 and the outlet 110.

The example axial flow control valve 100 described herein advantageously reduces manufacturing costs and simplifies maintenance of the axial flow control valve 100, provides an axially aligned passageway, and is substantially less susceptible to unwanted leakage due to misalignment of the valve trim components. The example axial flow control valve 100 also reduces manufacturing costs because the valve body 102 requires minimal machining and the valve body 102 may be formed via, for example, casting. Furthermore, the example axial flow control valve 100 reduces unwanted leakage because the cartridge assembly 104 is disposed within or mounted inside the valve body 102, thereby eliminating alignment issues between the valve body 102 and the valve seat 126, the flow control member 122, and the cage 130. Additionally, the axially aligned passageway 106 between the inlet 108 and the outlet 110 provides a minimally restrictive flow path through the valve body 102.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. An axial flow control valve comprising:
   a valve body defining a passageway between an inlet and an outlet, wherein the passageway is substantially parallel to a fluid flow path at the inlet and the outlet of the valve body; and
   a cartridge assembly housing a motor, the cartridge assembly disposed within the passageway of the valve body and removably coupled relative to the valve body in a direction along the fluid flow path, the cartridge assembly to engage a flanged portion of the valve body and an internal shoulder of the valve body spaced from the flanged portion and positioned between the inlet and the outlet, wherein the cartridge assembly is substantially axially aligned with the passageway, and the motor to operate the axial flow control valve between a first position to prevent the flow of fluid between the inlet and the outlet and a second position to allow the flow of fluid between the inlet and the outlet.

2. An axial flow control valve as defined in claim 1, wherein the cartridge assembly further comprises a valve seat and a flow control member operatively coupled to the motor via a valve stem, wherein the motor is to move the flow control member toward the valve seat to prevent the flow of fluid between the inlet and the outlet and moves the flow control member away from the valve seat to allow the flow of fluid between the inlet and the outlet.

3. An axial flow control valve as defined in claim 2, wherein the motor is operatively coupled to the flow control member via a transmission system.

4. An axial flow control valve as defined in claim 3, wherein the valve stem includes a threaded portion operatively coupled to the transmission system at a first end and coupled to the flow control member at a second end.

5. An axial flow control valve as defined in claim 2, wherein the cartridge assembly further comprises a cage coupled to the valve seat and to slidably receive the flow control member.

6. An axial flow control valve as defined in claim 5, wherein the cage and the valve seat are integrally formed as a unitary structure.

7. An axial flow control valve as defined in claim 5, wherein the cartridge assembly further comprises a bonnet coupled to the motor at a first end and coupled to the cage at a second end, wherein the bonnet includes a cavity to slidably receive at least a portion of the flow control member.

8. An axial flow control valve as defined in claim 2, wherein the valve seat includes a flanged portion having apertures that receive fasteners to removably couple the cartridge assembly to the valve body, and wherein the valve seat is disposed adjacent to the outlet of the valve body.

9. A control valve comprising:
a valve body having a passageway between an inlet and an outlet;
a flow control member slidably coupled to a housing, wherein the flow control member and the housing are disposed within the valve body; and
a motor coupled to the housing and mounted inside the valve body such that only a control fluid conduit portion coupled to a port of the motor is to extend outside of the valve body, the motor having a first inlet to receive a pressurized fluid to rotate the motor in a first direction to drive the flow control member toward a valve seat to prevent the flow of fluid through the valve body and a second inlet to receive the pressurized fluid to rotate the motor in a second direction opposite the first direction to drive the flow control member away from the valve seat to allow fluid flow through the valve body, at least one of the first inlet or the second inlet to receive a fluid flowing through the valve body upstream from the motor, and wherein the upstream fluid is to activate the motor when the pressure of the upstream fluid reaches a predetermined pressure.

10. A control valve as defined in claim 9, further comprising a valve stem operatively coupled to the motor at a first end and coupled to the flow control member at a second end.

11. A control valve as defined in claim 9, wherein the passageway, the inlet, and the outlet are substantially axially aligned.

12. A control valve as defined in claim 9, wherein the housing comprises a bonnet coupled to a cage, wherein the bonnet includes a cavity to partially receive a portion of the flow control member and the cage includes an aperture to slidably receive the flow control member.

13. A control valve as defined in claim 12, further comprising a valve seat coupled to an end of the cage, wherein the flow control member engages the valve seat to prevent the flow of fluid through the valve and moves away from the valve seat to allow the flow of fluid through the valve.

14. A control valve as defined in claim 13, wherein the valve seat is adjacent the outlet.

15. A control valve as defined in claim 9, wherein the flow control member and the motor are removably coupled within the passageway of the valve body via the housing, and wherein the housing is removably coupled to the valve body via fasteners.

16. A valve trim assembly for use with axial flow valves, comprising;
a cage coupled to a valve seat at a first end and coupled to a bonnet at a second end, wherein the bonnet and the cage form a cavity;
a flow control member slidably disposed within the cavity and to be driven to a first position to engage the valve seat and a second position spaced from the valve seat;
a motor to drive the flow control member between the first position and the second position;
a valve stem operatively coupled to the motor at a first end and coupled to the flow control member at a second end, wherein the valve trim assembly is to be mounted inside a valve body substantially parallel to a fluid flow path through the valve body between a flange portion of the valve body and an internal shoulder of the valve body; and
a gear transmission coupled to the motor, wherein the gear transmission includes a planetary gear system coupled to an arm member having a threaded aperture that is to receive a threaded portion of the first end of the valve stem.

17. A valve trim assembly defined in claim 16, wherein the valve trim assembly is to be removably coupled within the valve body via fasteners.

18. A valve trim assembly defined in claim 16, wherein rotation of the motor in a first direction rectilinearly drives the valve stem in a first direction to move the flow control member to the first position and rotation of the motor in a second direction opposite the first direction rectilinearly drives the valve stem in a second direction to move the flow control member to the second position.

19. A valve trim assembly as defined in claim 16, further comprising a thrust bearing to restrict the lateral movement of the planetary gear system along an axis of the valve stem.

* * * * *